United States Patent Office 3,491,151
Patented Jan. 20, 1970

3,491,151
PREPARATION OF ALKYLATED
HYDROXYLAMINES
Henry Bader, Newton Center, Mass., assignor to Polaroid Corporation, Cambridge, Mass., a corporation of Delaware
No Drawing. Filed July 11, 1967, Ser. No. 652,420
Int. Cl. C07c 89/00
U.S. Cl. 260—584                 13 Claims

ABSTRACT OF THE DISCLOSURE

Mono- and di-substituted hydroxylamines are prepared by reacting hydroxylamine and an alkylating agent in a dipolar aprotic solvent.

---

This invention relates to novel chemical processes, and more particularly, to novel improved processes of preparing N-substituted hydroxylamines.

One object of this invention is to provide improved methods of preparing N-substituted hydroxylamines whereby increased yields may be obtained.

More particularly it is an object of this invention to provide an improved synthesis of N-substituted hydroxylamines by the direct alkylation of hydroxylamine in a dipolar aprotic solvent.

Another object of the present invention is to provide an improved process to prepare compositions useful as developing agents for the development of silver halide emulsions.

A further object of this invention is to provide N-substituted hydroxylamines suitable for use in developer compositions useful in diffusion transfer processes.

The invention accordingly comprises the several steps and the relation and order of one or more of such steps with respect to each of the others, and the compositions possessing the features, properties and the relation of elements which are exemplified in the following detailed disclosure, and the scope of the application of which will be indicated in the claims.

Other objects of this invention will in part be obvious and will in part appear hereinafter.

Heretofore, the direct alkylation of hydroxylamine as a mode of preparing di-substituted hydroxylamines and secondarily mono-substituted hydroxylamines was considered to be an impractical synthesis since even with very reactive alkyl halides only low yields were obtained. This was reported in the literature of the last century by C. Schramm (Ber., 16, 2184 (1883) and later by Jones and Sneed (J. Amer. Chem. Soc., 39, 674 (1917) who obtained the two products illustrated by the equation:

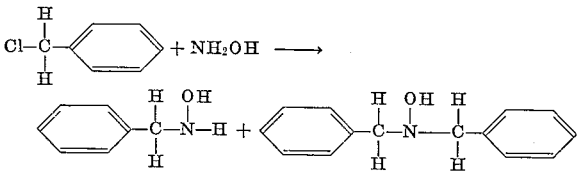

In 1963, Klages et al, reported (Chem. Ber., 96, 2387 (1963) the obtainment of 23% yields of N,N-dibenzyl-O-ethylhydroxylamine from benzyl chloride and ethoxamine.

Utilizing a different approach to an alkylation, Jones and Burns (J. Amer. Chem. Coc., 47, 2966 (1925)) reacted ethylene oxide with hydroxylamine and obtained a low yield of bis(2-hydroxyethyl)hydroxylamine.

It has now been discovered that di-substituted and mono-substituted hydroxylamines can be prepared in good yields by the direct alkylation of hydroxylamine in a dipolar aprotic solvent in the presence of an acid acceptor.

It has further been discovered that good yields of the desired substituted hydroxylamine can be obtained when the alkylating agent utilized is either an alkyl halide containing 1–17 carbon atoms or an alkyl ester containing 1–17 carbons, as well as such halides and esters wherein the carbon chain is interrupted by an oxygen atom.

It has been still further discovered that the reaction can be manipulated to favor the production of either the mono-N-substituted or the di-N-substituted hydroxylamine as desired, such that extremely high yields of the preferred product can be obtained.

The present invention relates to the preparation of compounds which correspond to the following formula:

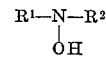

wherein each of $R^1$ and $R^2$ are independently selected from the group consisting of hydrogen, alkyl, cycloalkyl, alkoxyalkyl, aralkyl, alkoxyalkoxyalkyl, or alkenyl radical, no more than one of $R^1$ and $R^2$ being hydrogen. The alkyl, alkoxy and alkenyl radicals preferably contain from 1 to 3 carbons, but may contain more carbons provided the resulting compound is soluble in 5% aqueous sodium hydroxide.

The preferred alkoxyalkyl hydroxylamines include:

N,N-di-(2-methoxyethyl)-hydroxylamine
N,N-di-(2-ethoxyethyl)-hydroxylamine
N,N-di-(2-methoxyethoxyethyl)-hydroxylamine
N-ethyl-N-2-ethoxyethyl hydroxylamine (1) 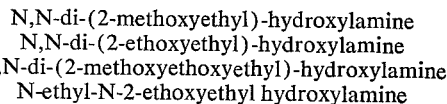

N,N-di-(2-methoxyethyl)-hydroxylamine (2) 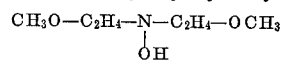

(3) 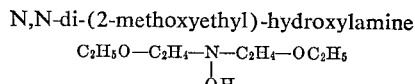

(4) 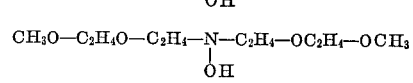

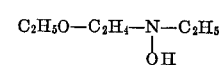

N-ethyl-N-2-ethoxyethyl hydroxylamine (5) 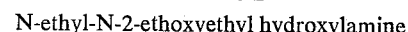

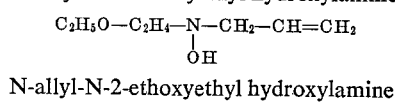

N-allyl-N-2-ethoxyethyl hydroxylamine

It has now been found that the direct alkylation of hydroxylamine proceeds quite favorably in a dipolar aprotic solvent. The term aprotic is known in the art. Reference is made to Parker, Quart. Rev., (London), 16, 163 (1962). Any suitable dipolar aprotic solvent can be utilized in the process of the present invention.

Typical solvents include dimethyl sulfoxide (DMSO), dimethylformamide (DMF), dimethylacetamide (DMAC), tetramethylene sulfone (sulfolane), butadiene sulfone (3-sulfolene) and dimethyl sulfone.

Any suitable alkylating agent which is capable of donating an "R" group containing from about 1–17 carbon atoms, said group being selected from an alkyl, aralkyl of cycloalkyl group can be utilized. It is to be noted that the denoted group may have an oxygen atom interspaced between two carbon atoms. Compounds suitable as alkylating agents include the halides, and esters such as the sulfonates and sulfates. Typical compounds of the above class include ethyl iodide, decyl bromide, methoxyethyl bromide, amyl chloride, cyclopentyl chloride, benzyl iodide, butyl bromide, methoxymethyl para-toluenesulfonate, propyl benzenesulfonate, propenyl metatoluenesulfonate, phenethyl methanesulfonate, dibutyl sulfate, diethoxyethyl sulfate, and dixenylmethyl sulfate.

While alkylation can be achieved by the use of alkyl bromides, chlorides and iodides, it was found that the chlorides require longer reaction times to obtain high yields. Thus, at the end of 48 hours, only 2% yields of end product were obtainable, whereas with the bromides and iodides 50–60% yields of di-alkyl hydroxylamines are obtained after this time period.

The general reaction for the alkylation with a halide is as follows:

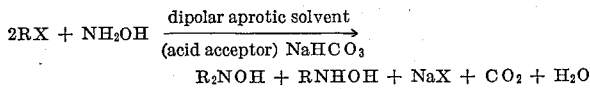

High quantity yields can also be obtained in short reaction periods when the alkylating agent is an alkyl ester. Notably fine results have been obtained when methoxyethyl para-toluenesulfonate was utilized as the alkylating agent. The reaction involved when the reagent is used is as follows:

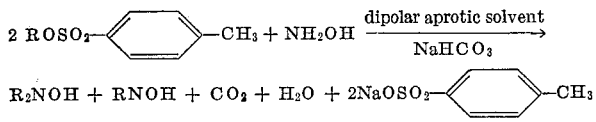

wherein R is $(CH_3-O-C_2H_5-)$.

Any suitable acid acceptor that will neutralize the acid generated in the reaction can be utilized. Typical compounds include sodium bicarbonate, potassium borate and calcium phosphate. The synthesis can be carried out successfully between about 0° C. and about 60° C. However, if an inhibitor is added to prevent the decomposition of hydroxylamine, even higher temperatures can be utilized. The preferred operating range, however, is between about 35° and about 55° C.

In the ordinary course of events, the alkylation process will give rise to both the mono- and di-substituted hydroxylamines. By adjusting the reaction conditions, as would be known in the art, and by limiting or increasing the molar ratio of alkylating agent to hydroxylamine, the preparation of the desired end product can be maximized.

It was found that yields on the order of 60% of di-substituted product could be attained.

It will be understood that in the situation where a mixture of mono- and di-substituted hydroxylamines are prepared, that separation of the two can be carried out by distillation, since for any particular mono-substituted hydroxylamine, the corresponding di-substituted compound will have a significantly different boiling point to allow for separation in this manner.

The following detailed examples are given only to illustrate the preparation of preferred compounds within the scope of this invention, and are not intended to be in any way limiting.

EXAMPLE I

Solid sodium bicarbonate (45.4 g.; 0.54 mole) was added over a 5-minute period to a solution of 11.5 g. (0.165 mole) of hydroxylamine hydrochloride and of 1.0 g. of potassium iodide in 50 ml. of dimethyl sulfoxide and 10 ml. of water. When the evolution of carbon dioxide ceased 50.5 g. (0.363 mole) of bromoethyl methyl ether was added rapidly and the mixture was warmed to 32° C. when rapid gas evolution started again. The mixture was kept under an atmosphere of nitrogen at 32–37° for 36 hours by which time no more carbon dioxide was evolved. The mixture was brought to pH8 with 50% sodium hydroxide, extracted several times with 100 ml. portions of benzene, then filtered, and the solid was washed again with benzene. The dried extracts were freed of solvent leaving a residue of 34.8 g. of an oil. Analysis by titration and vapor phase chromatography indicated an overall yield of 52.6% of bis(2-methoxyethyl) hydroxylamine and 17.5% of 2-methoxyethylhydroxylamine.

EXAMPLE II

To a solution of 5.75 g. (0.0825 mole) of hydroxylamine hydrochloride in 25 ml. of dimethyl sulfoxide and 1.0 ml. of water 22.7 g. (0.27 mole) of sodium bicarbonate was added with stirring and under an atmosphere of nitrogen. To this solution 41.9 g. (0.182 mole) of 2-methoxyethyl p-toluenesulfonate was added and the stirring continued at 35° C. for 17 hours. The temperature was slowly raised to 50° over a period of four hours and was kept at that temperature for a further three hours. To the cooled mixture 4 ml. of water and 100 ml. of benzene were added, a solid was filtered, the organic phase was separated and the aqueous phase was successively extracted with benzene. Removal of the solvent gave 34.7 g. of an oil which contained 21.8% of bis(2-methoxyethyl)hydroxylamine (corresponding to an overall yield of 61.5%) and 6.95% of 2-methoxyethylhydroxylamine (corresponding to a 27.2% yield).

EXAMPLE III

Same as Example 1, but using 2-chloroethyl methyl ether instead of 2-bromoethyl methyl ether. The overall yield of bis(2-methoxyethyl)hydroxylamine was 2.6%.

EXAMPLE IV

To a solution of 5.75 g. (0.0825 mole) of hydroxylamine hydrochloride in 25 ml. of dimethyl sulfoxide and 1.0 ml. of water 22.7 g. (0.27 mole) of sodium bicarbonate was added with stirring and under an atmosphere of nitrogen. To this solution 33.8 g. (0.182 mole) of 2-methoxyethyl iodide was added and the stirring continued at 35° C. for 20 hours. The temperature was increased to 50° C. and kept at this temperature for a further 4 hours. Work-up in a manner described in Example 2 gave 37.0 g. of an oil which contained 23.0% of bis(2-methoxyethyl)hydroxylamine (corresponding to an overall yield of 62.7%) and 9.0% of 2-methoxyethylhydroxylamine (corresponding to a 20.1% yield).

When the experiment of Example 1 was performed utilizing an aqueous methanol solvent which is not a dipolar aprotic solvent, instead of dimethyl sulfoxide, no product was obtained at the end of 48 hours.

While the preparation of substituted hydroxylamines by the process of the present invention has been demonstrated in the above examples as being performed batchwise, the process can, by suitable adaptation as is known in the art, be practiced in a continuous manner.

As previously mentioned, the compounds prepared by the process of this invention are useful as developing agents in conventional or wet development of silver halide emulsions, diffusion transfer processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 3,293,034, issued Dec. 20, 1966 to Milton Green et al.

In diffusion transfer processes of this type, as is well known in the art, an exposed silver halide emulsion is treated with a liquid processing composition while in superposed relationship with an image-receiving material. The liquid processing composition develops exposed silver halide to silver and reacts with unexposed silver halide to form a complex silver salt which is transferred to the image-receiving material and there reduced to silver to form a positive print. The processing composition includes a silver halide solvent, such as sodium thiosulfate, and may also contain a film-forming material for increasing the viscosity of the composition. As used herein, the term "silver halide solvent" refers to reagents which will form a soluble complex with silver halide, as is well known in the art of forming silver images by transfer.

Since certain changes may be made in the above compositions and processes without departing from the scope of the invention herein involved, it is intended that all matter contained in the above description shall be interpreted as illustrative and not in a limiting sense.

What is claimed is:

1. The process of preparing substituted hydroxylamines corresponding to the formula:

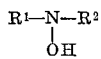

wherein $R^1$ and $R^2$ each are selected from hydrogen, alkyl, cycloalkyl, alkoxyalkyl, aralkyl, alkoxyalkoxyalkyl and alkenyl, not more than one of $R^1$ and $R^2$ being hydrogen, which comprises reacting hydroxylamine with an alkylating agent in a dipolar aprotic solvent at a temperature between 0° and 60° C.

2. The process of claim 1 wherein the reaction is carried out between about 35° and about 55° C.

3. The process of claim 1 wherein said reaction is carried out in the presence of an acid acceptor.

4. The process of claim 1 wherein the solvent is selected from the group consisting of dimethyl formamide, dimethyl sulfoxide and dimethyl acetamide.

5. The process of claim 1 wherein the solvent is dimethyl sulfoxide.

6. The process of claim 1 wherein the alkylating agent is selected from the group consisting of alkyl halides selected from chlorides, iodides and bromides and alkyl esters selected from sulfonates and sulfates.

7. The process of claim 6 wherein the alkylating agent is an alkyl halide.

8. The process of claim 6 wherein the alkylating agent is an alkyl ester.

9. The process of claim 1 wherein the alkylating agent is methoxyethyl bromide.

10. The process of claim 1 wherein the alkylating agent is methoxyethyl para-toluenesulfonate.

11. The process of claim 1 wherein the solvent is dimethyl sulfoxide and the alkylating agent is methoxyethyl bromide.

12. The process of claim 1 wherein the solvent is dimethyl formamide and the alkylating agent is methoxyethyl para-toluenesulfonate.

13. The process for preparing substituted hydroxylamines which comprises reacting methoxyethyl para-toluenesulfonate with hydroxylamine in dimethyl sulfoxide at a temperature between about 35° and about 55° C.

References Cited

UNITED STATES PATENTS 3,243,462  3/1966  Smith.
3,293,034  12/1966  Green et al.

CHARLES B. PARKER, Primary Examiner

R. L. RAYMOND, Assistant Examiner

U.S. Cl. X.R.

96—29; 260—563, 570.8, 570.9, 583